(12) United States Patent
Pacheco

(10) Patent No.: US 7,935,013 B2
(45) Date of Patent: May 3, 2011

(54) COMBA BALL WITH MAGNUS EFFECT

(76) Inventor: Francisco Pacheco, Heredia (CR)

( * ) Notice: Subject to any disclaimer, the term of this patent is extended or adjusted under 35 U.S.C. 154(b) by 149 days.

(21) Appl. No.: 12/223,668

(22) PCT Filed: Feb. 9, 2006

(86) PCT No.: PCT/CR2006/000003
§ 371 (c)(1),
(2), (4) Date: Aug. 6, 2008

(87) PCT Pub. No.: WO2008/077354
PCT Pub. Date: Jul. 3, 2008

(65) Prior Publication Data
US 2009/0082144 A1    Mar. 26, 2009

(51) Int. Cl.
*A63B 41/08* (2006.01)
(52) U.S. Cl. .................. 473/604; 473/607; 473/599
(58) Field of Classification Search .......... 473/603–605, 473/607, 612, 598, 599, 596; D21/709, 713
See application file for complete search history.

(56) References Cited

U.S. PATENT DOCUMENTS

| | | | | |
|---|---|---|---|---|
| 1,299,092 A * | 4/1919 | Abrahamson | ................. | 473/595 |
| 2,819,753 A * | 1/1958 | Nogue | ................. | 473/604 |
| 3,887,183 A * | 6/1975 | Saso | ................. | 473/595 |
| 5,681,233 A * | 10/1997 | Guenther et al. | ................. | 473/605 |
| 5,820,501 A * | 10/1998 | Soofi | ................. | 473/599 |
| 5,865,697 A * | 2/1999 | Molitor et al. | ................. | 473/605 |
| 6,916,263 B1 * | 7/2005 | Pacheco | ................. | 473/607 |
| 7,462,119 B2 * | 12/2008 | Kelly | ................. | 473/604 |

* cited by examiner

*Primary Examiner* — Steven Wong
(74) *Attorney, Agent, or Firm* — H. Jay Spiegel; Robert L. Haines

(57) ABSTRACT

This invention refers to the structure for a ball or ball cover that comprises a plurality of interconnected panels comprising first and second groups of panels which combined form a sphere. The first group of panels define at least two different surface areas of the ball or ball cover disposed at polar extremes on the surface of the sphere and the second group of panels define an area of the surface in the form of a ring, with at least three undulations and disposed in the equatorial zone of the surface of the ball or ball cover, creating a separation between the polar extremes defined by the first group of panels; whereby the width of the ring is modified to improve the sphericity of the ball or ball cover and obtaining a ball of a selected measurement (C).

15 Claims, 10 Drawing Sheets ural well-distributed balls has acquired importance in the last few years, above all in the field of soccer (football). Although it is possible to produce a molded ball having an almost perfect spherical shape, achieving this in a ball that is made from a plurality of sewn panels has proven to be very difficult. Multipanel balls compete in price with balls constructed by the new thermal-bonding technique and are also preferred by many players. The current trend is directed mainly to the search of a fast ball that provides a greater dynamic to the sport. To achieve a greater velocity of the ball in its displacement it is important that it not only have an adequate panel distribution, that would give it greater sphericity, but also that it have a structure that allows a good distribution of the existing tension between the different panels. The technical advances are directed in this sense but none include improvements in the performance of kicks with a curve effect.

COMBA BALL WITH MAGNUS EFFECT

FIELD OF THE INVENTION

This invention refers to a structure for a ban or cover of a ball of the sewn variety comprising a plurality of joined panels wherein the arrangement of the panels results in a ball forming an almost perfect sphere. The design of structurally well-distributed balls has acquired importance in the last few years, above all in the field of soccer (football). Although it is possible to produce a molded ball having an almost perfect spherical shape, achieving this in a ball that is made from a plurality of sewn panels has proven to be very difficult. Multipanel balls compete in price with balls constructed by the new thermal-bonding technique and are also preferred by many players. The current trend is directed mainly to the search of a fast ball that provides a greater dynamic to the sport. To achieve a greater velocity of the ball in its displacement it is important that it not only have an adequate panel distribution, that would give it greater sphericity, but also that it have a structure that allows a good distribution of the existing tension between the different panels. The technical advances are directed in this sense but none include improvements in the performance of kicks with a curve effect.

BACKGROUND OF THE INVENTION

The sphericity of the ball is measured through the comparison of its diameters in at least 16 directions. From the measurements obtained, we take the difference between the lesser measurement and the greater measurement to divide it by the average measurement of all the measured diameters. In this way we arrive at a parameter or coefficient of error for the measurement of the sphericity of the ball, from now on we will name it the sphericity tolerance (ST) of the ball.

The FIFA is the worldwide regulating entity for soccer and in its regulations it allows an (ST) of 2% for balls with the "inspected" seal and an (ST) of 1.5% for balls with the "approved" seal. For example, when making a soccer ball emulating the structure of planet Earth, the calculation of the sphericity would be the following: when subtracting the polar axis (12,714 km) from the equatorial axis (12,757 km), we obtain a difference of 43 km, which is divided by the average measurement of the diameter, to obtain an (ST) factor of less than 0.4%. This form of oblate spheroid that our planet adopts comes from its constant turning, which avoids its perfect sphericity, but maintains enough qualities to pass a hypothetical FIFA test.

In multipanel balls, a good distribution in the shape of the panels will guarantee a good result in the (ST) measurements, especially when a ball is measured after having been used for a game when the panels start to stretch because of the tension and internal forces of the structure. It is normal for tension to exist between the panels since we pretend to give a spherical form to a group of panels that where originally flat. Besides the form of the panels, an inadequate sewing procedure can negatively affect the (ST) sphericity results. Since it is difficult to control the human error, it is important to start the process with a group of panels that when put into practice will result in a ball having an improved sphericity. The technique considers that the improvements in sphericity of the balls used for ball games, allow the ball to behave in a more consistent way.

The improvements in sphericity of the panels emerged in the world cup Mexico 70, when the "bucky" ball (icosa-dodecahedron of 32 panels) was substituted for the then standard ball construction based on a cubic conformation of 18 panels. Two decades later new improvements are achieved in the (ST) through modifications carried out on the bucky ball with the introduction of the "Geo" ball, that consists in shortening three sides of the hexagon in order to achieve a considerable improvement in the sphericity is shown in U.S. Pat. No. 5,674,149. A further improvement was made in 1999 with the "Design for a compact ball" (Spanish Patent Office filing # 2,152,888). Through the patent of the present inventor U.S. Pat. No. 6,916,263 of 2005, as well as the introduction to the market of sewn designs such as the "Geo" and thermal-bonding molded designs such as the "Roteiro" and "Teamgeist", the sphericity of the ball has been taken to factors nearing 100%.

According to the article "An exact method for the sphericity measurement of soccer balls" Neilson, et al., Proc. Instn. Mech. Engrs. Vol., 217, Part B; J. Engineering Manufacture, p. 715-719, 2003, the consistency in circumference and diameter does not guarantee a true sphericity of the ball since there are cases in which the ball adopts a constant lobed shape, that is not detected by traditional systems of measurement.

Some of the proposals for rearranging the panels described in U.S. Pat. No. 6,916,263 can form the lobed shapes described by Neilson. The present invention provides a means to correct this bulling, through a better distribution of the tension forces that operate within the basic spherical structure thereby providing a ball with a more nearly perfect sphericity. The new method also facilitates the formation of different types of spheroids having diverse characteristics.

OBJECT OF THE INVENTION

It is an object of the present invention to produce a ball structure having an improved degree of sphericity tolerance (SI).

It is a further object of the present invention to produce a ball having one of its axes with a measurement different from the other two.

Another object of the present invention is to produce a ball structure having an ornament that facilitates the visualization of the position of the axis with different measurement.

It is still a further object of the present invention to provide a method of designing different types of balls or ball covers, comprising combining three procedures: a triangle adjustment procedure, described in the present inventor's prior U.S. Pat. No. 6,916,263, which is incorporated herein by reference, a structural rearranging procedure, that separates one of the ecliptic belts from the rest of the structure and a band width reduction process that defines the type of spheroid that will be constructed (oblate, prolate or sphere).

The present invention eliminates the tension and bulking points, found in previous designs through a procedure of structural readjustment that separates the ball's cover into three independent parts, two polar and one equatorial (see FIG. 1), where the undulating form of the separate equatorial structure allows for the polar structures to balance their tensions.

When individualizing the equatorial structure from the rest of the spherical surface, the polar structures will freely adjust to adopt, in a natural way, an extended spheroid (FIG. 2), with its longer axis located precisely in the direction of the poles. Then, through a procedure of diminishing the width of the equatorial structure, that eliminates part of the spherical surface (FIG. 3), the longitude of the extended polar axis is reduced and the sphericity is improved (FIG. 5).

Through the selection of the different measurements of a lesser longitude for the width of the equatorial structure, a procedure of transformation of the ball's sphericity takes place; that converts the extended spheroid (prolate) into a flat spheroid (oblate), passing in the middle of this transformation process, through a special band width that converts the spheroid into a perfect sphere presenting a particular case in which all the axes have the same measurement.

When making a ball with an ideal band width intermediate between oblate and prolate, the buffer mechanism of the ecliptic band is activated (FIG. 7) and positions the internal tension of the panels in an ideal intermission that allows the ball to deform in one or other sense when it undergoes a kick and return to spherical following the application of the kicking force.

SUMMARY OF THE INVENTION

When we observe the Earth in photographs taken from the moon, the planet seems to be pretty spherical. Even so, as we saw before, the terrestrial structure has an error of sphericity (ST) of at least a 0.3%. Our planet is far from being a perfect sphere, instead it has the form of a flat spheroid (oblate), since its polar axis is shorter than the equatorial axis. It is proven by conventional physics that the oblate form of the Earth and in general of other planets, is due to the rotation on their own axis. If the planet was static, it would be perfectly round.

It is common for the masses that revolve on one axis to adopt a flat spheroid form. When the deformation is minimum and less than 1.5% in the case of a regulation ball, it is barely perceivable at plain view and it requires either machines or an expert eye to be appreciated. Emulating the form of our planet as a premise to be able to make a ball easily maintain its rotating axis, we have designed a method for the construction of spherical structures that allows for the easy modification of the distance of the polar axis of the ball in regards to its equatorial axis.

We expect that a small modification in the measurement of its turing axis is enough to help a ball to maintain its turning axis and that way promote the stability of the ball's trajectory. This characteristic is particularly appreciated in the corner kicks and free kicks in soccer. In the rest of the game the ball will simply behave like any other ball, kicked in a random way on any part, since it would have the regulation sphericity to be used in an official game.

The present invention provides a ball or cover for a ball with a selected circumference measurement (C), which comprises a plurality of interconnected panels made up of a first and second group of panels, wherein the first group of panels define at least two different areas of the ball's surface or of the ball's cover, located in opposite polar extremes of the cover, and the second group of panels define the form of an undulated ring located in the equatorial part of the cover, midway between the polar extremes, where the reduction of the height that makes up the width of the undulatory band allows for the reduction of one of the spheroid's axes and in this way the sphericity of the ball or of the ball's cover is improved.

The present invention also supplies an inflatable ball for ball games having a selected circumference measurement (C'), a surface comprising a plurality of basic interconnected forms (FIG. 8) comprising eighteen squares, twenty four trapeziums and eight equilateral triangles, the squares having four sides of substantially equal length (a) and two corresponding diagonals of a length (d), six of them with a central point (X) and the other twelve squares with a central point (Z), the triangles having three sides of a substantially equal length (c) and a central point (Y) and the trapeziums having four sides made up of two legs of side (a) a base of side (a) and a shorter side of side (c), each one of the trapeziums enclosed by three of the squares and one of the triangles, where the sides (c) of the trapeziums are connected to the sides (c) of the equilateral triangles and the legs of side (a) of the trapeziums are connected to the sides (a) of the squares with a central point (Z) and the bases of side (a) of the trapeziums are connected to the sides (a) of the squares with the central point (X), and where the interconnected basic forms are grouped in at least three sections, two sections comprising nine trapeziums, three squares with central point (X), three squares with central point (Z) and four equilateral triangles forming a polar structure, and at least one section comprising six squares with central point (Z) and six trapeziums located in an interleaved way where the legs (a) of the trapezium join with the opposite sides of the squares until they form an equatorial structure that shows at least three undulations, that in U.S. Pat. No. 6,916,263 of the inventor it is named ecliptic and that now we also call ecliptic band, where the extreme part of the undulation in the direction of one of the poles and the extreme part of the undulation in the direction of the opposite pole form a band width, that in the U.S. Pat. No. 6,916,263 has a width of (b+e); where the undulations in the edges of the polar structures join coincident edges on both sides of the ecliptic band, to conform a spherical cover, the improvement comprising reducing the width of the ecliptic band by between 20% and 50%, through which the sphericity of the ball is improved.

The present invention further provides a method for improving the sphericity and roundness of a ball or ball cover having a circumference of selected measurement (C) and comprising a plurality of interconnected panels defining in the ball or ball cover at least three distinct surface areas corresponding to two polar hemispheres joined by a single ecuatorial band; the method comprising decreasing the width of each one of said panels comprising the ecuatorial band, thereby generating changes in the polar and equatorial axes of the ball.

The present invention still further provides a method for improving the sphericity and roundness of a multipanel ball or ball cover having a circumference of selected measurement (C), the panels comprising 24 trapezoids, 18 squares and 8 triangles arranged in three groups, wherein two identical groups of 9 trapezoids, 6 squares and 4 triangles form substantially triangular polar hemispheres and one individual group of 6 trapezoids and 6 squares forms an equtorial band having alternative undulations with three undulations in a first direction and three undulations in a second and opposite direction, where the three corners of each substantially triangular panel correspond to central points of octants of the ball; the method comprising positioning of the vertices of said substantially triangular panels of one of the said identical groups in the three undulations of the individual group that go in a first direction and the positioning of the vertices of said substantially triangular panels of the other identical group in the three undulations of the individual group that go in the second direction so that the area adjusts to a measurement that satisfies the circumference (C) in all directions.

Furthermore, we show how the present invention can adapt to the construction of multi-panel balls, having different panel forms.

DESCRIPTION OF THE INVENTION

Figure 1:
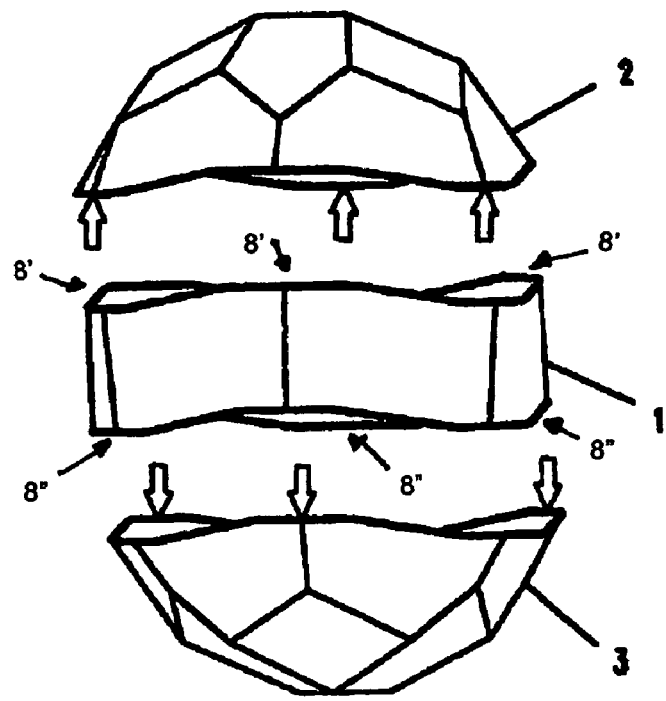
FIG. 1 illustrates the bipolar symmetry of a ball according to the present invention divided into polar and equatorial sections.

In view of the explosion of new technologies incorporated into soccer balls, currently there is a debate on the part played by the conformation of the ball in the precision of the kick. There are some who maintain that the arguments of predictability, trajectory, consistency, balance, greater velocity, spin easiness, among others, are simple marketing weapons (Peter Brancazio, "SportsScience"). The "Roteiro" ball has been praised by Beckham, his sponsor, for its high sphericity and precision, but criticized by players of the national French team for being little precise (we still have to hear what is going to be said about the "Teamgeist" ball in the world cup Germany 2006, similar to "Roteiro" in its fabrication). The improvement in the sphericity of the "geo" ball over the "bucky" design is less than 1% but it seems that the sports science is not convinced that this improvement effectively facilitates the mastery of the ball, in good part because it is difficult to prove the results of performance due to how complicated it is for science to measure and predict the player's movement.

We consider, as it is stated at "soccerballworld.com", that the precision of the kick improves as the roundness of the ball increases and that when the ball is deformed it tends to curve in an uncontrolled way. In the free kicks and in the corner kicks on occasions players look for the ball to make a curve but in a controlled way and this technique is difficult to achieve. There is a technique to create curved trajectories and professional players, in an intuitive way, control the necessary physics to do what in common terms is called "banana" or "comba" shot. The article "The physics of football" (Physics World, June 1998, www.physicsweb.org), states that the curving of a ball in physics is called the Magnus effect of the ball that forms a lateral deflection as it turns on its perpendicular axis. The technique supposes to hit the ball in a precise place, in the equatorial part, in an exact point between the center and the border, with lots of spin and force.

The Magnus effect is due to the interaction between the spinning ball and the viscous air. For a spinning balls the passing air is moving in the same direction as the surface of contact on one side of the ball and is moving in the opposite direction as the surface of contact on the other side of the ball. Therefore the relative speed of the air is lower at the side where it flows along with the rotating surface of the ball and the Reynolds number is likewise lower on that side. The viscous air separates from the ball's surface at a more downstream position on the side at which the air moves in the same direction as the rotating surface.

In contrast, on the other side of the ball, the point of separation is earlier due to the larger Reynolds number on that side. As a result, the airflow pattern around a spinning ball is not symmetric. The moving direction of the airstream is twisted to the side on which the air moves opposite to the rotating surface. Moreover the turbulent is also deflected to this side. Following Newton's $3^{rd}$ law of motion, there is a reaction force that the ball pushes the airstream as well as the turbulent wake to the opposite side. The Magnus force is the resultant sideways reaction force due to the deflection of the air flow while the wake deflection force is the resultant sideways reaction force due to the deflection of the turbulent wake. The Magnus force and the wake deflection force operate to deflect the spinning ball in the same direction based on the direction of spin that is imparted to the ball. Thus, if a ball is kicked so as to rotate clockwise about an axis perpendicular to its direction of motion, the deflection will be to the right, whereas, if the ball is kicked with a counter-clockwise spin, the deflection will be to the left.

Experiments conducted in the 1970's showed that increasing the spin on a ball produced a higher lift and, hence, a larger Magnus force. However, increasing the velocity of the ball at a given spin reduced the lift coefficient. This means that a slow moving ball with a high rate of spin will have a larger sideways force than a fast moving ball with the same spin rate so as the ball slows at the end of its trajectory, the curve becomes more pronounced. Assuming that the rate of spin had not decayed much, then the drag coefficient increased and introduced a larger sideways force causing the ball to bend further.

In soccer, most players know that when you strike a ball straight on with your instep so that the foot hits the ball in line with the ball's center of gravity, then the ball shoots off in a straight line. However, if you kick the ball with the front of your foot and with the angle between your leg and foot at 90°, the ball will cure in flight. In this case the impact an the ball is off-center causing the applied force to act as torque and impart a spin to the ball Studies show that an increase in the coefficient of friction between the ball and the foot cause the ball to acquire more spin. There is also more spin if the offset position is further from the center of gravity. However, if the offset distance is to great, then the foot is in contact with the ball for a shorter period of time and over a smaller area which results in a decrease in both the spin and the velocity of the ball. Accordingly, there is an optimum place to hit the ball to achieve maximum spin. Hitting too close or too far from the center of gravity will result in hire or no spin. In addition, even if the coefficient of friction is zero, the ball will still gain some spin if it is kicked with an offset from its center of gravity. In this case, even though there is no peripheral force parallel to the circumference of the balls the ball nevertheless deforms towards its center which causes some force to act around the center of gravity imparting spin to the ball.

In addition to the Magnus effect, a spinning ball tends to distort due to centripetal such that the poles flatten and the equator expands. The effect on a ball is to form an oblate, or slightly flattened, spheroid and improves the stability of the ball in flight as well as the accuracy and control with which the player can position the ball. This is particularly the case in a ball which, at rest, is an almost perfect sphere as the polar flattening effect results in an equatorial diameter that is greater that the polar diameter. In the case of a ball that is less of a perfect sphere and more of a prolate spheroid, i.e., polar diameter greater than equatorial diameter, the stabilizing effect of the polar flattening would be less. Accordingly, the ability to produce a ball that is as close to a perfect sphere as possible is particularly advantageous.

Figure 7:
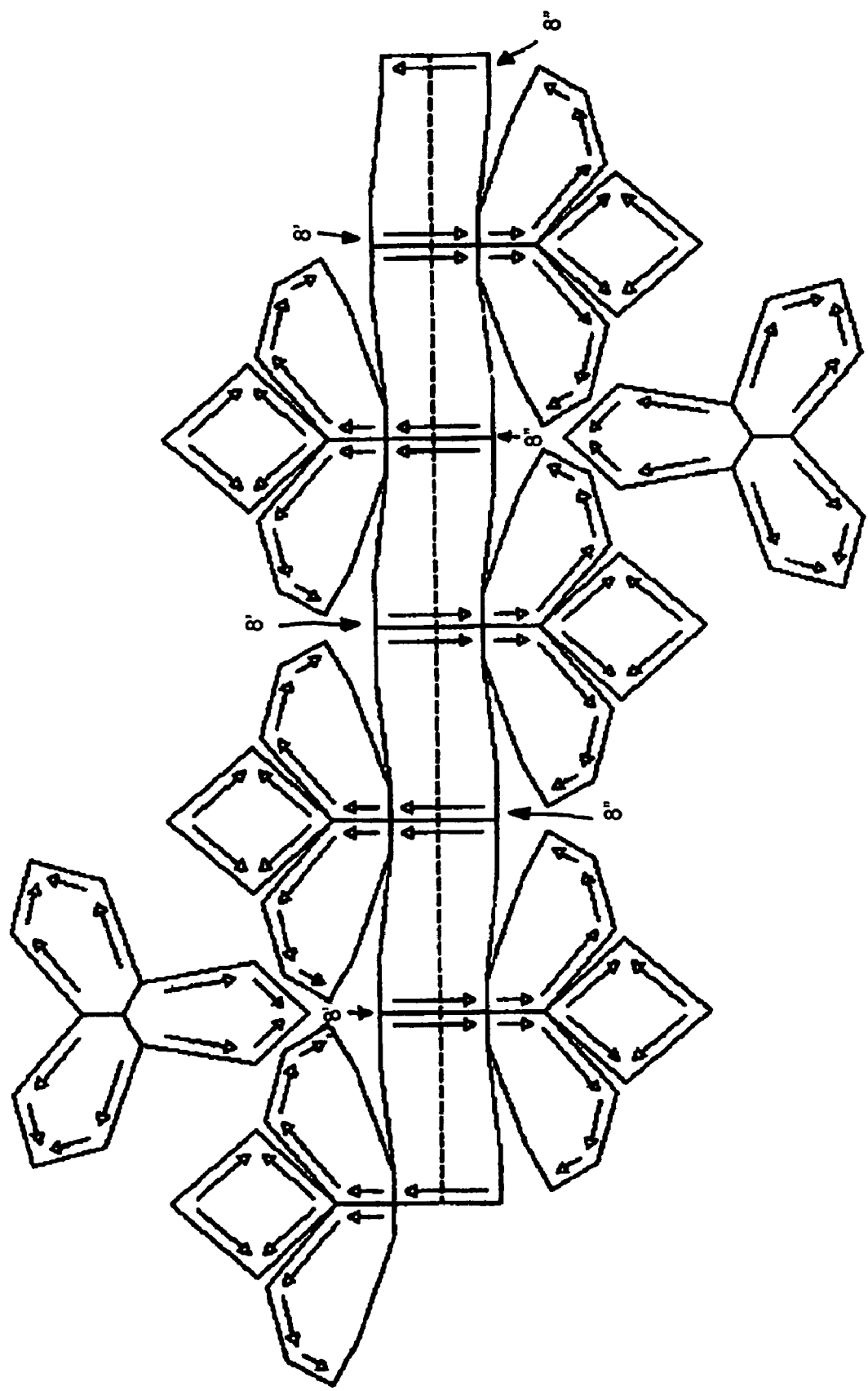
FIG. 7 is a plan view of the preferred panel arrangement of the ball of the present invention showing the buffer mechanism of the ecliptic band, the arrows representing the stretching direction of the panels created by the spinning revolutions of the ball.

In the present invention we describe our design for a ball with special structural characteristics that facilitate for the ball to adopt an oblate form when it is hit in a precise place. With the incorporation of an undulating band 1 in the equatorial part of the ball separating first and second polar hemispheres 2 and 3 (FIG. 1), the movement of the cover in the direction of the equatorial zone is made possible when it is spun on its polar axis. The forces of inertia that create the spin in combination with the structural design of the ball, facilitate the ball to adopt the oblate form. None of the known designs have these characteristics, so the comba ball is the first ball specially designed for the execution of free kicks and corner kicks with a curve. When the ball is kicked with the required spin force about its polar axis and in the direction perpendicular to its spinning axis, it adopts an oblate form, and once the force of inertia created by the spinning revolutions diminishes, the ball goes back to its natural spherical form. The undulating band facilitates the direction of forces about and through the panels to accommodate the tension of deformation and recovery (FIG. 7).

In the present invention we furthermore supply a method to create different type of balls, from perfectly spherical ones to other types of extended and squat spheroids. The possibility of manufacturing balls with variations in the length of the polar axis with respect to the equatorial axis is especially important for the practice sessions. If the player practices his corner kicks and free kicks with a slightly oblate ball he needs a greater effort to kick it in the precise place that allows the ball to adopt the polar axis as the spinning axis. Once the player dominates the technique with the practice ball, he will have better skills when he uses the spherical version. Moreover when using three different colors for the three independent sections of the ball (FIG. 1) the player can easily observe, right after the kick, the trajectory of the ball and the form in which it is spinning, and thereby be able to make immediate corrections to improve his kick. Furthermore, the structure and color of the described ball, makes the practice of free kicks more fun and opens the possibility to promote curve-shot tournaments, which are a favorite theme of soccer fans.

Figure 8:
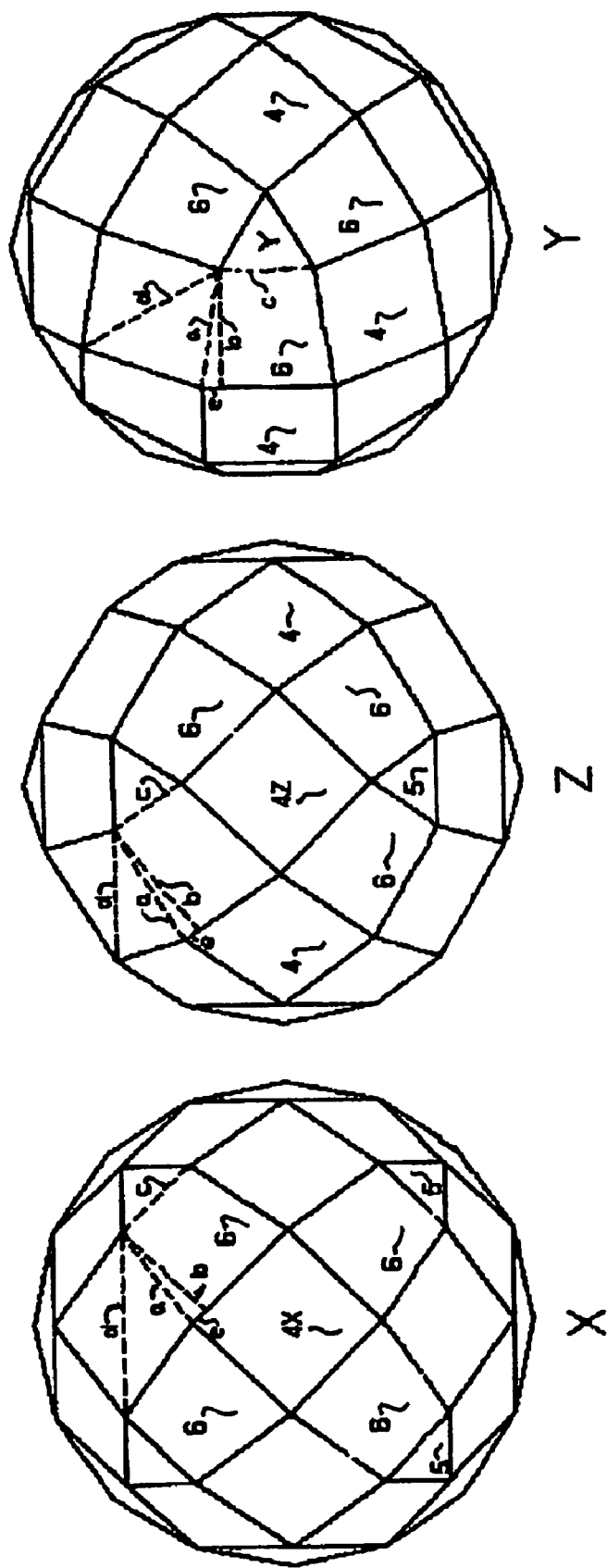
FIG. 8 illustrates the 50 panel ball of U.S. Pat. No. 6,916,263 in three views centered on X, Y and Z.

In the U.S. Pat. No. 6,916,263, we have described in detail how to achieve an important degree of sphericity, in respect to the longitudes of at least 17 circumferences clearly defined over the ball. Of all the possibilities of design presented in this document, the basic one consists of the 50-panel arrangement (FIG. 8).

The strategy utilized in our previous design consisted basically of forming an 18 square net over a spherical surface and, through a process of adjustment of the measurements of 8 additional Y-triangles, to look for an improvement in the measurement of the circumferences that were considered. Based on the original 50 panel design, we proposed further options of sub-assemblies of panels, to form bigger panels, smaller panels or to subdivide the basic panels.

In the present invention, we propose the preceding design possibilities, with the restriction that the panels selected to carry out the sub-assemblies should contemplate an individualization and differentiation of the ecliptic band panels from the rest of the panels of the structure. This process of rearrangement of panels is shown in FIG. 1 and divides the surf of the balls into three individual sections, made up of different groups of panels, where the group of panels comprising the ecliptic equatorial band a of the ball, is located midway between the two groups comprising the polar hemispheres 2 and 3 of the spherical surface.

Figure 2:
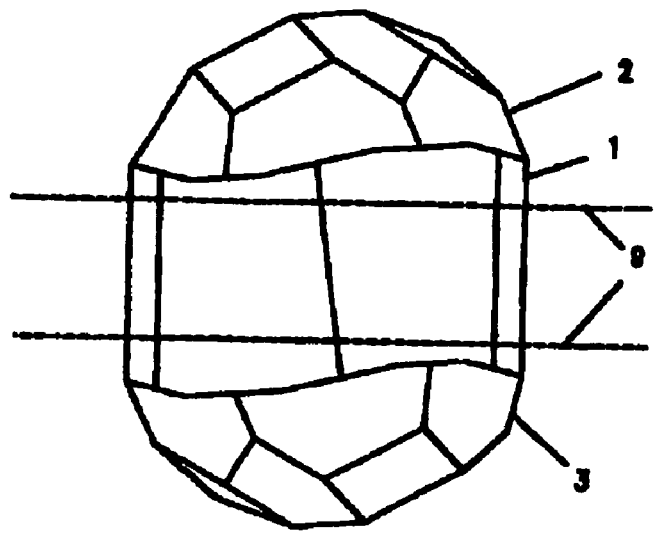
FIG. 2 illustrates the procedure of eliminating a strip from the ecliptic band reducing the longitude of the extended polar axis.

Once the model is defined and the ball is constructed, the separation of the surface into three individual parts promotes the adoption of an extended form for the spherical surface (FIG. 4), which obliges for a reduction in the width of the equatorial band 1 by deletion of the portion shown by the parallel dotted lines 9 (FIG. 2) in order to normalize the figure to a spherical form. When combining these procedures, we achieve a method that allows for the distribution of the spherical surface in diverse ways, making it possible to take the sphericity of the ball to a level nearer to 100% than in previous balls.

Figure 3:
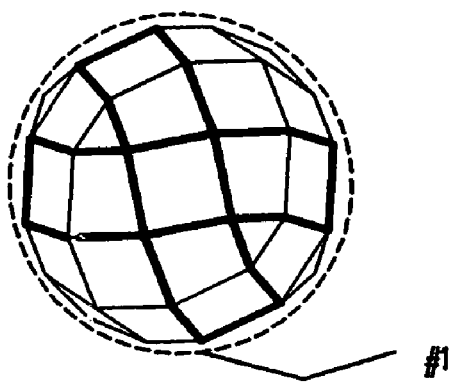
FIG. 3 illustrates a larger ball of circumference C' from Step 1 of the method of the present invention.
Figure 4:
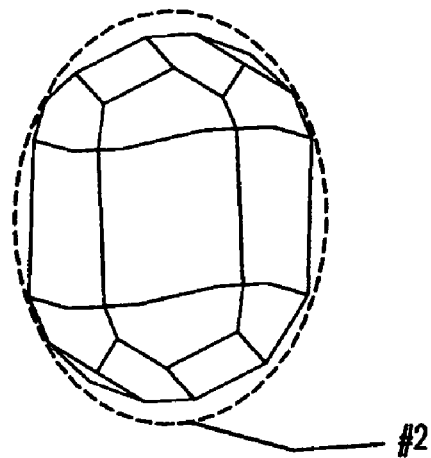
FIG. 4 illustrates the elongated extended prolate spheroid having the extended polar axis resulting from Step 2 of the method of the present invention.
Figure 5:
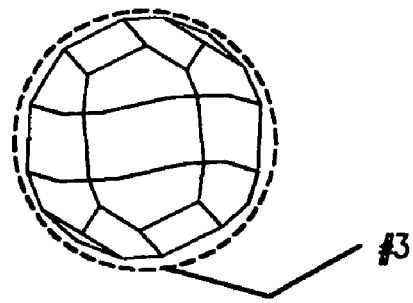
FIG. 5 illustrates the ball of circumference C resulting from Step 3 of the method of the present invention

We will summarize the construction procedures fir the ball of the present invention as follows: The procedures of triangle adjustment, which consists of adjusting the measurement of the areas of the equilateral triangles, described in the U.S. Pat. No. 6,916,263 (FIG. 3). The procedure of structural rearranging of panels that individualizes the structure of one of the ecliptic bands 8 from the rest of the structure (FIG. 4). The procedure of adjustment of the ecliptic band 8, that consists of reducing the width of the band 8, thereby improving the sphericity (FIG. 5).

A fourth optional step of the process consists of lesser subdivisions of panels that allow for the transference of surface sectors that make up the groups of polar panels to the group of equatorial panels and vice versa. These adjustments are considered as lesser modifications, as we will see later.

The present invention supplies the technique and method for creating designs, balls or spherical covers for balls incorporating this procedure of individualization and reduction of the width of the band, with regards to the cover of the ball of the U.S. Pat. No. 6,916,263.

Following is a brief revision of the basic structure of this patent.

The basic design, considered in the mentioned patent initially divides the ball in accordance with the following distribution (as shown in FIGS. 8 and 10 A): 18 squares 4, 8 triangles 5 and 24 trapeziums 6.

Figure 11:
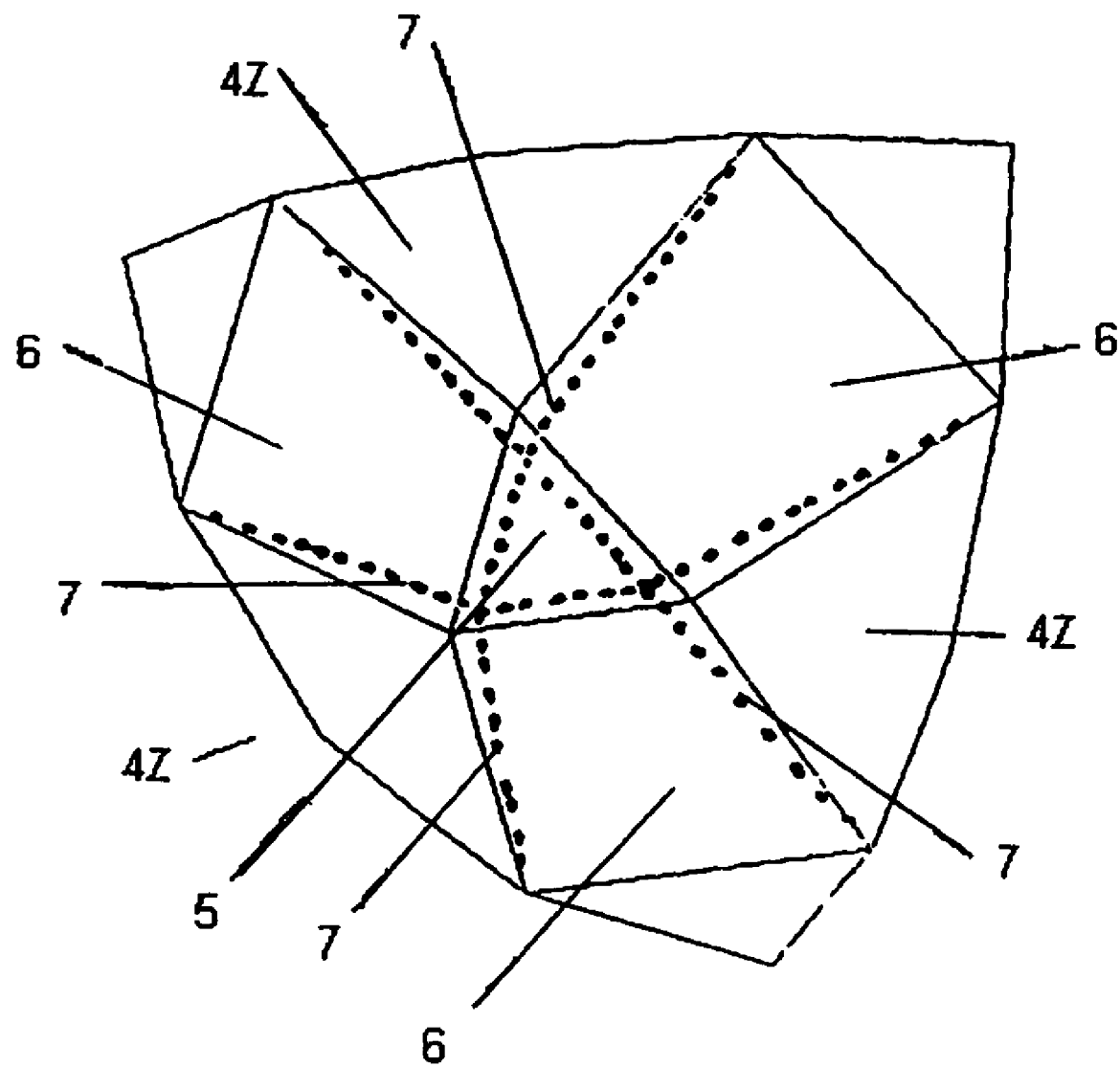
FIG. 11 illustrates a single octant of a ball of the present invention with Z squares enlarged to form rhombuses

This distribution locates one equilateral triangle 5, also called Y-triangle, in the central part of each octant of the surface of the ball (FIG. 11). The operation of adjustment of the triangles, which constitutes the initial step of the method, consists of modifying the measurement of the equilateral central triangle until we find a measurement that satisfies efficiently the circumferences. Depending on the case if we generate a triangle of a lesser or greater area, this procedure makes the central area of each octant of the ball closer or farther away from it's absolute center.

A second alternative to consider, consists in altering, besides the triangles, the measurements of the 3 squares with a central point (Z) 4Z that surround each triangle 5 (located in the middle of 2 octants); however, the dimensions of the squares-X with central point (X) 4X (located in the middle of 4 octants) are left fixed. With this procedure we achieve the same effect of getting the central area of the octant closer or farther away from the center of the sphere, but in this case the three squares-Z 4Z that surround the triangle turn into rhombuses. The FIG. 11 shows in a dotted line 7 the extended diagonals of the squares Z 4Z to form rhombuses.

The importance of these changes that the original square suffers in order to transform into a rhombus lies in the fact that we achieve substantial improvements in the measurements of the 17 circumferences that we defined on the ball (in C1, C2 and the ecliptic circumference, C3). In particular, with a specific measurement for the base of the Y-triangle 5, adjacent to the lesser side of the trapezium 6, we can achieve a sphericity factor equal to 1 (case C1=C2=C3, as we describe in U.S. Pat. No. 6,916,263).

In our previous patent we describe different possibilities for the arrangement of the panels, all of them based on the configuration of 50 panels (FIG. 10 A) Furthermore, in the claims 4, 5 and 6, of the present inventor's previous patent we establish the different possibilities of subassembly. Of the described proposals we can say that the assembly of the FIG. 8c of U.S. Pat. No. 6,916,263 made up of 24 panels in the form of a kite, produces excellent results for sphericity (SF) and roundness (RF) factors. Nevertheless, we have noted that some options, for example, FIG. 8k of U.S. Pat. No. 6,916,263, even though they present a subassembly that in theory maintains the composition of the mathematical formulas that make up the measurements of circumference, result in practice in a ball having a poor sphericity tolerance (ST), that considers not only circumference, but also diameters.

Figure 10A:
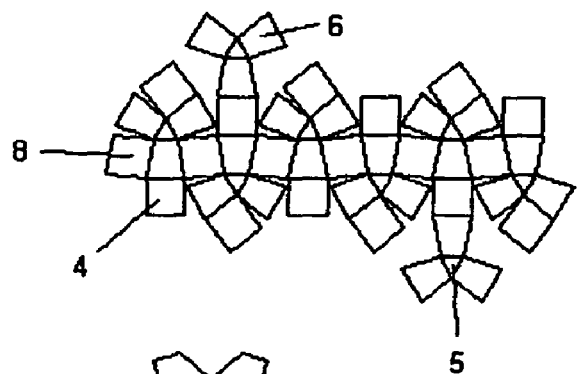
FIGS. 10A-10E illustrate alternative panel arrangements for the ball of the present invention with a selected ecliptic in the middle separating the groups of polar panels; A is a 50 panel, B is a 36 panel C is a 30 panel, D is a 24 panel and E is an 18 panel.

The present invention presents a method for solving the defects in the (ST) for these types of panel arrangements which includes selecting one ecliptic as a substantially horizontal equatorial band which separates two identical polar hemispheres. As an example for our descriptions we have selected a 36-panel arrangement, that will make easier to follow the resulting transformations of the proposed method. FIG. 10 B shows the conformation of the arrangement made up of a total of 36 panels (similar to FIG. 8K of U.S. Pat. No. 6,916,263), derived from a subassembly of the basic 50-panel arrangement (FIG. 10A). In accordance with the liberty that the mentioned patent provides, in regards to selecting the form of the square or rhombus 4Z and the measurement of the triangle (c) 5, we selected the formulation C1=C2=C3 (before mentioned) for our described example, but our starting point could have been any other, only that the width band reduction process would have also varied, as we will see later on. The result of the measurements when building the described 36-panel model (FIG. FIG. 10B), presents a squatting in the points X and Y, that is perceived more when measuring the diameters, than when measuring the circumferences.

When departing with other measurements or when selecting other designs for this first step of the method, different from our selected example for the descriptions, we will possibly find sphericity defects and squatting in other places. This is normal because the changes in the distribution of the seams in accordance with the selected arrangement directly affects the results. We can say that the selected layout for the seams convey to the final result certain restrictions of accommodation that affect the sphericity of the ball. This is the reason for some of our previous designs showing small defects that we correct in the present invention.

As we said above, some of our previous best arrangements show very good results.

The next step of the strategy in the construction of the "comba-ball", in accordance with the present invention seeks to mitigate the described accommodation restrictions implanted by the seams. Following we detail the procedure of spherical surface distribution into two polar sectors, separated by an undulating band that works as a tension buffer, that gives the structure greater liberty to naturally accommodate distortion and recovery. By individualizing the ecliptic to a single equatorial band, it is found that the tensions throughout the ball accommodate, resulting in a ball with improved sphericity and performance.

The operation of structural rearrangement consists of using the same subassembly and subdivision possibilities described in the previous patent, with the limitation that the arrangement of panels selected must liberate or provide independence to the structure of one of the ball's ecliptic bands, from the rest of the panel& The objective of this limitation is to give way to the possibility of a natural system of compensation for the accommodation of the spherical surfaces located on both sides of the ecliptic band.

Figure 10B:
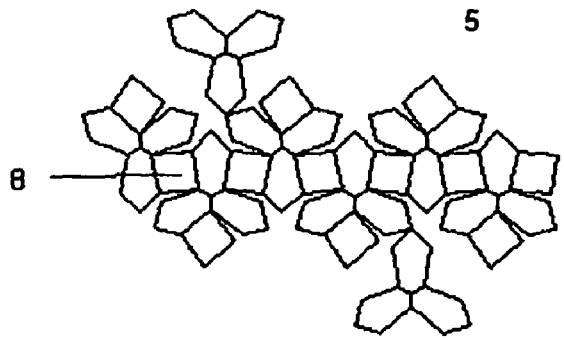

If we observe the arrangement of the panels described in FIG. 10B, mentioned in the first step of the method, we note how the ecliptic band 8 is not independent from the rest of the structure. A first transformation that our example model may suffer is the one we can observe in FIG. 10C. This accommodation transforms the 36-panel arrangement into a 30-panel arrangement. Another observable change when comparing the figures is that instead of having two types of panels, now the new model has four different types of panels.

In general the traditional designs use at the most two different types of panels, achieving a symmetry and balance for the ball's cover and facilitating the mathematical calculation for the design. This type of symmetry makes sure that the tensions that are created in the panels are distributed in a uniform way. Contrary to the common practice, instead of using symmetries like the icosadodecahedron or like other arrangements of a cubic character, we use a bipolar symmetry that allows us to achieve better adjustments of sphericity and furthermore, create a ball that incorporates special characteristics when it turns in its polar axis, as we will see later.

Figure 12A:
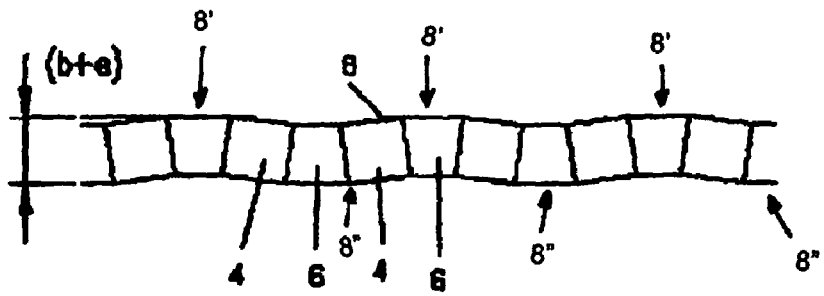
FIGS. 12A-12E illustrate alternative panel configurations for the ecliptic band where A is the basic 50-panel form, B is a modified form with vertical seams, C is a modified form with angled seams, D is a modified form with diagonal seams, E is a single panel ecliptic band with the dotted lines representing the reduction of Step 3.
Figure 12B:
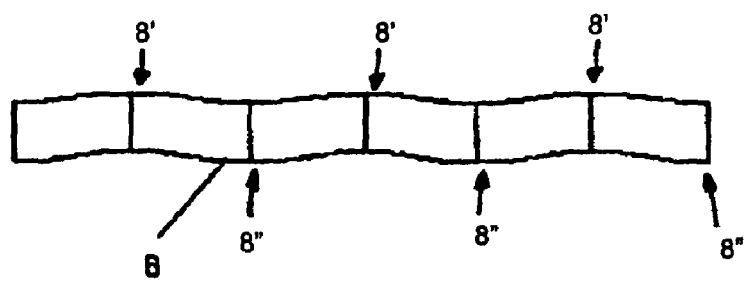
Figure 12C:
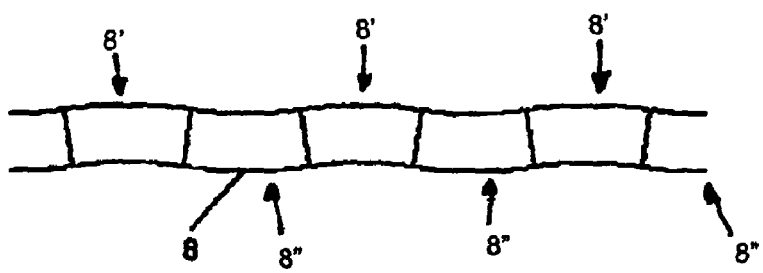
Figure 12D:
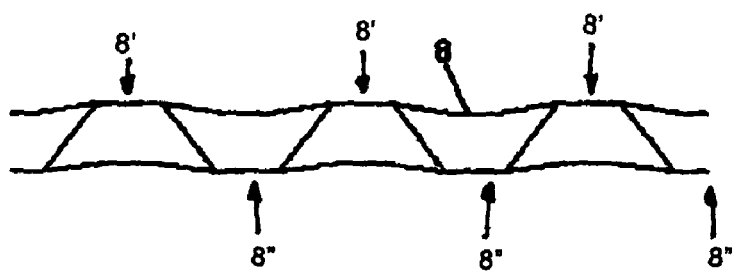
Figure 12E:
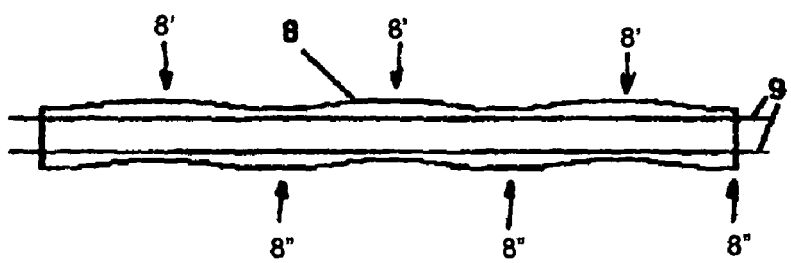
Figure 13A:
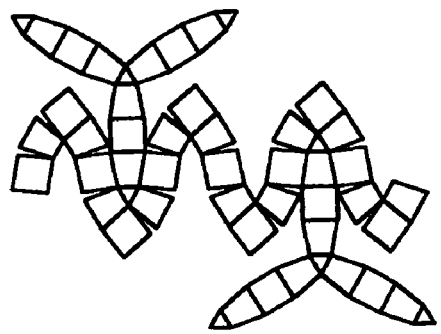
FIG. 13 illustrates alternative panel arrangements.
Figure 13B:
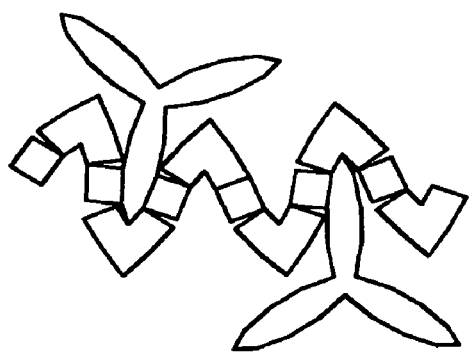
Figure 13C:
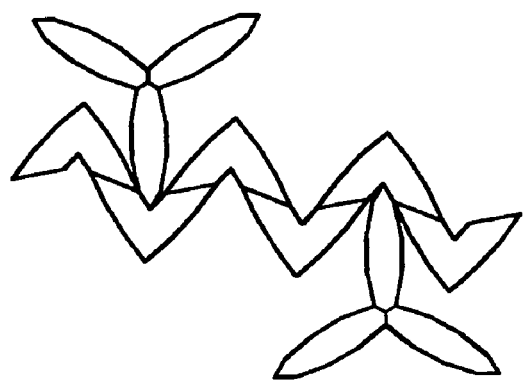
Figure 13D:
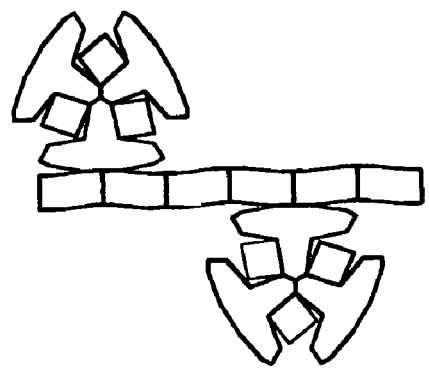
Figure 14:
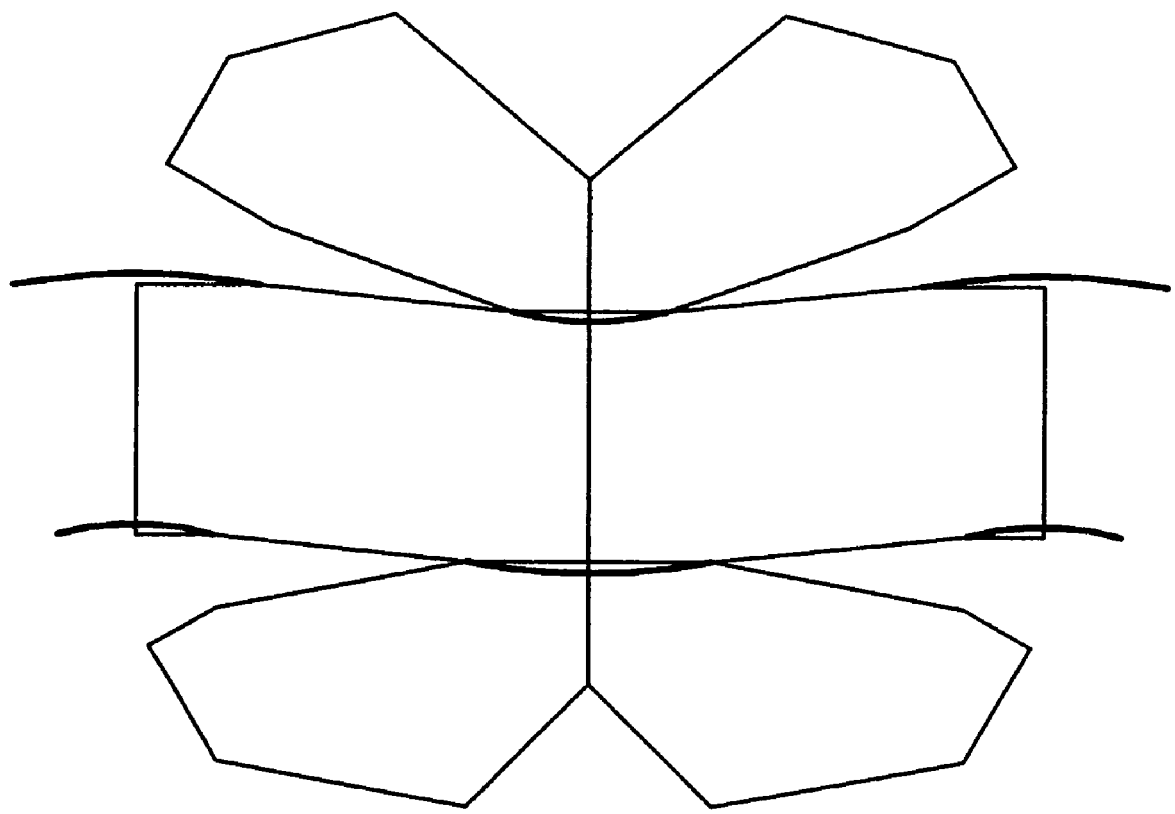
FIG. 14 illustrates the smoothing of curves operation of the optional step 4.

The bipolar symmetry is defined automatically when carrying out a panel sub-assembly that separates one of the ecliptic bands (FIG. 1), from the rest of the structure (remember that the mentioned patent presents an interconnection of four ecliptic bands, in FIG. 3 we highlighted two of them). The FIGS. 10 D and 10 E are some examples of sub-assemblies of 24 and 18 panels that can be carried out starting from the 30-panel model from FIG. 10 C. Let's observe that these three arrangements respect the restriction of maintaining the ecliptic band 8 (highlighted in FIGS. 10 C, D and E) independent from the rest of the surface. Let's also observe that the ecliptic band 8 appears in these figures, made up of six pieces as a product of the union of half a trapezium 6 to both sides of the lateral square 4 (FIG. 12B) as compared with FIG. 12A which illustrates the original 12 panels comprising six squares 4 and six trapeziums 6. We could have also thought of another alternative for the connection of the band, through the union of half a lateral square 4 to both sides of the trapezium 6 (FIG. 12 C), where the cuts of the trapezium 6 and squares 4 could also have occurred through one of their diagonals (d) of the squares 4 (FIG. 12 D), or even use only one panel for the whole ecliptic band 8, as showed in FIG. 12E where lines 9 represent the reduction of the band 8 in step 3. It is important to say that the possibilities of rearranging the 50 original panels are various (see inventors U.S. Pat. No. 6,916,263, claims 4, 5 and 6, and inventors publication WO2005/ 079928, page 13, line 6, where we describe 72 coordinates, that should be conserved in order to maintain ideal SF and RF factors), but the important aspect is to individualize the ecliptic from the rest of the structure, in order to facilitate for the ball to adopt a natural accommodation. In FIG. 13 we can study some of the various alternative to the structural arrangement, including more pronounced ways to individualize the undulations.

Once we have made the decision about selecting one of the possible configurations, when inflating the ball, the independence of the three sectors of the cover (FIG. 1), give liberty to the material to stretch in the direction of the poles. The result is that the ball transforms into an extended spheroid (prolate spheroid), where the polar axis grows and the equatorial axis decreases as shown in somewhat exaggerated form in FIG. 4.

Thanks to the design restriction of the method, in regards to the need for independence in the ecliptic, when inflating the ball the ecliptic band 8 works as a tension buffer, since it has the ability to stretch and shrink around the equatorial zone of the cover (FIG. 7). This characteristic allows the ball to have a special behavior when it rotates around its polar axis. When the ball has the form of a prolate spheroid with its polar axis extended, it has similar characteristics to a projectile, with the facility to be launched while spinning on its polar axis and traveling in the direction of its polar axis, as you would do with an american football ball. Nevertheless, with the third step of the method, we look to reduce the width of the band, in order for the ball to recuperate its sphericity and even be able to become an oblate spheroid (reduced polar axis). A ball with an oblate spheroid form, has characteristics that facilitate its launching with rotation on its polar axis and translation in a perpendicular direction to its polar axis, like you would do on a frisbee.

Following, we detail the last step of the strategy in the construction of the "comba-ball". In accordance with the present invention, this step seeks the reduction of the longest polar axis in order to make it equal to the other two equatorial axes. This will allow us to manipulate the design for the construction of the different types of spheroids that allow for the construction of balls closer and farther away from the ideal (ST) for a regulation ball.

The third step of the present method proposed to achieve an improved ball structure, is directed towards solving the polar extension that the ball adopts when accommodating its structure in accordance with the freedom, obtained from the buffer mechanics of the ecliptic band (FIG. 4). This extension in the form of a prolate spheroid is solved by eliminating a strip from the ecliptic band 8 which is represented by the linear space defined between dotted lines 9 (FIGS. 2 and 12E), allowing us to modify the cover in order to bring it closer to an ideal ball.

The present invention solves the described prolate stretching of the ball cover, by applying what we call the operation of "adjustment of the ecliptic band" that consists, basically, of decreasing the width of the ecliptic band 1 positioned midway between the polar hemispheres 2 and 3 of the spherical surface (see middle section of FIG. 1), made up of six trapezium 6 and six squares or rhombus 4 (note that under the proper circumstances a square can serve as a rhombus) (FIG. 12A), until achieving the formation of the type of spheroid wanted, usually the most spherical. The equatorial ecliptic band 8 that was separated and individualized from the structure during step two of the method, defines generally parallel sides along its length and generates three undulations 8', 8" each in the direction of both poles, bordering six of the eight Y-triangles 5, located precisely in the elongated sections of both polar caps (see arrows in FIG. 1).

After step one (FIG. 3) and two (FIG. 4) of the proposed method, from now an also called Step 1 and Step 2, respectively, the structure accommodates in such a way that the polar circumference extends and the equatorial circumference shortens. Then, when decreasing the width of the ecliptic band in Step 3 of the method (FIG. 5), the internal tensions of the spheroid's structure start to accommodate as well as the initial circumference also decreases. In order to determine an adequate degree of reduction, the band has to be reduced until reaching the desired spheroid, usually a sphere. The operation of "adjustment of the ecliptic", for each design option and material used, can be done through a method of trial and error, where we establish the next decrease based on the results of the previous trial until the circumferences are equal In practical tams, the decrease required for the change in the width of the ecliptic band (DC) corresponds to a total equal to half of the change between the circumference over the polar axis (PC) and the circumference over the equatorial axis (EC), so that $DC \approx \frac{1}{2}(PC-EC)$.

Figure 9A:
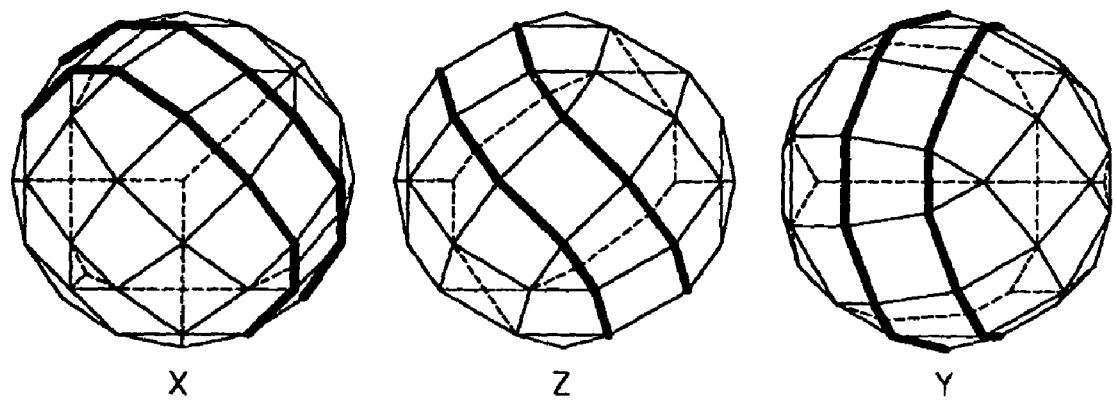
FIG. 9A illustrates the modification of a 50 panel ball arrangement so as to form a 30 panel ball of the present invention.
Figure 9B:
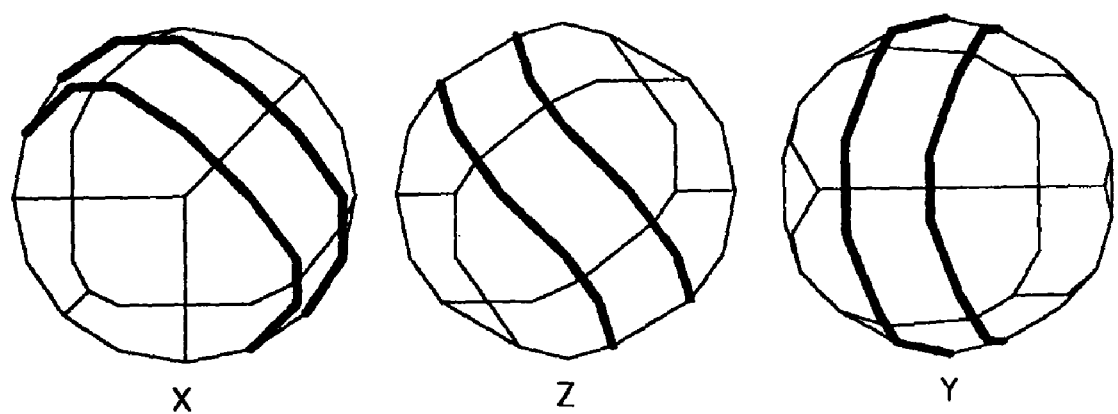
FIG. 9B illustrates the 30 panel arrangement of the present invention.
Figure 10C:
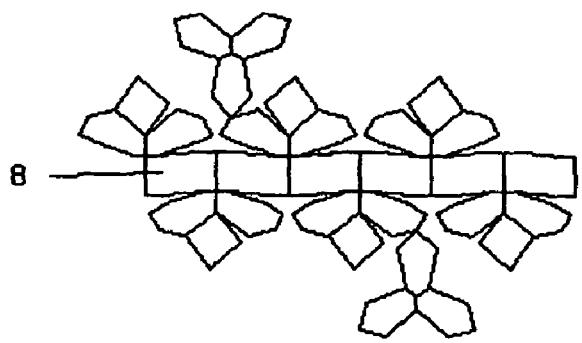
Figure 10D:
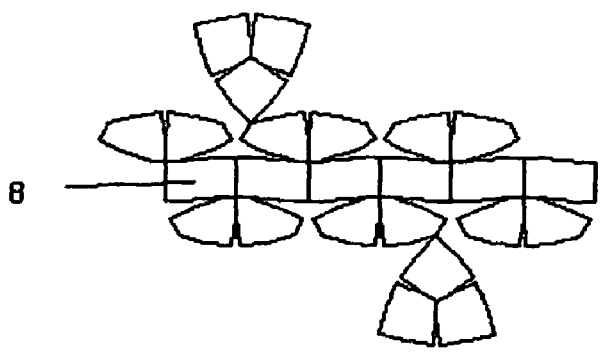
Figure 10E:
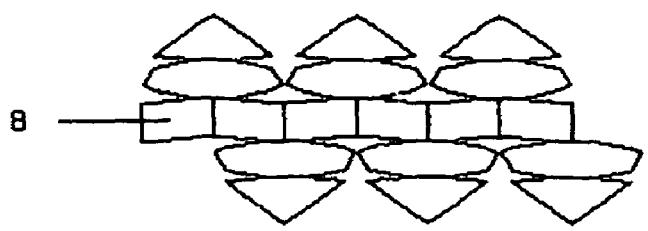

Following with our example for the descriptions of the present method, for the case of the 30-panel design of FIGS. 9B and 10C, with the use of an adequate material, the reduction of the width can be calculated by determining an initial circumference (C') for the ball that should be approximately 5% bigger than the final wanted circumference (C), so that $C'=1.05 \times C$. After building ball (C') in accordance with the indications of Steps 1 and 2 of the method, that due to separating the ecliptic strip it automatically produces an extension of the polar circumference (PC) of approximately 1.5% and a shortening of its equatorial circumference (EC) of approximately 3%, so that $PC \approx C' \times 1.015$ and $EC \approx C' \times 0.97$. Then, when carrying out the optimum adjustment of the ecliptic band described in this Step 3 of the method, the circumference of the ball reaches the desired circumference (C), of a smaller size than that of (C'), but with an improved (ST).

Following we present a numerical example of the results of the measurements obtained for a concrete case of the construction of a 36-panel ball of FIG. 10B, according to Step 1, with an initial circumference measurement (C')≈70 centimeters. When building the modified ball, in accordance with Step 2, with a 30-panels arrangement, the described stretching is produced to obtain differentiated circumferences: (PC) ≈71 centimeters and (EC)=68 centimeters. In order to move both measurements closer to each other, we carry out Step 3, by eliminating part of the width of the ecliptic (FIGS. 2 and 12d) thereby creating an effect that reduces the measurement of the polar circumference (PC) in a greater proportion than the reduction in the equatorial circumference (EC). In this way we are able to equal (PC) with (EC) in a point of the desired circumference (C)=67 centimeters, where as we initial said C=C'/1.05.

Even though the end result of Step 3 is a smaller ball, in the practice the construction of a (C') ball, uses exactly the same dies as a (C) ball, with the exception of the die for the equatorial band that must be reduced to approximately 71% of its original width (for the type of material used), in order to obtain satisfactory results in the (ST) measurements. Let's observe that the ecliptic band appears to require two different dies, of three pieces each (see FIGS. 12 B, C and D). However, in the practice by inverting the material it is possible to utilize only one die. So Step 3 requires the modifying of the width of only one die to carry out the improvements in the (ST) of the ball while the rest of the dies proportions remain the same.

Figure 6:
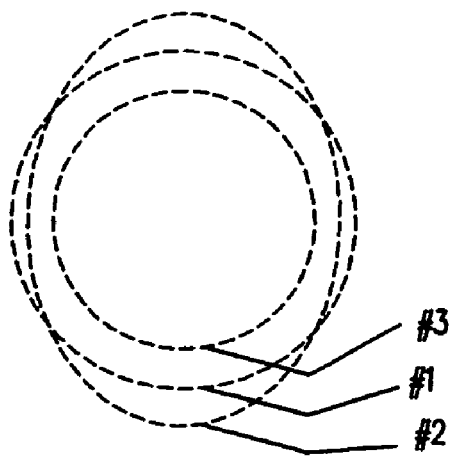
FIG. 6 illustrates the steps of FIGS. 3-5 in one representation showing the relative relationship between the larger ball #1, the extended prolate spheroid #2 and the improved final ball #3.

In general terms we can conclude that in Step 3, when we eliminate a strip along all the length of the ecliptic band, by a width of DC≈½(PC-EC), the ball recovers the sphericity lost in the expansion of Step 2 (FIG. 6 resumes the transformations of the three steps numbered #1, #2 and #3). The explanation of the above formula is that the polar circumference (PC) is affected in two times the width of the eliminated strip, given that (PC) measured in any direction, always goes across the ecliptic band twice. Nevertheless, this process of reduction of the width of the band, at the same time reduces the size of the ball. The reduction in the equatorial circumference (EC), produced by the decrease in the width of the ecliptic band, is difficult to perceive, since the cut in the width is not supposed to alter the length of the belt However in the practice the tensions caused by the elimination of part of the spherical surface, when reducing the width of the band end up causing a smaller decrease in the equatorial measurement (EC). For this reason, the calculation of the reduction is not simply "dividing the difference by two", as we described before in general terms, instead it requires additional adjustments that justify the use of a trial and error method, as we described above.

The fact of reducing the ecliptic band die from Step 2, to approximately 70% of the original width (for our 30-panel design, in a selected material), allows us to bring the roundness of the ball to an improved (ST) in Step 3, in terms of the original (ST) from Step 1. Even though balls with the same circumference can produce different results for the calculation of the (ST), due to the resistance of the materials used, the fundamental method to determine the degree of decrease of the ecliptic band is always the same, with a maximum degree of possible decrease of about (b) ((b2) when utilizing rhombuses) where the ecliptic band disappears However, in the majority of the cases, the degree of decrease necessary to achieve the selected (ST) will generally be such that the ecliptic band is between 60% and 80% of the original width. In the case of the structure of the described ball a decrease to 70% from the original is required (enough to achieve acceptable (ST) levels). Preferably, for the ball "C1=C2=C3" from the U.S. Pat. No. 6,916,263, in a 30-panel arrangement, a decrease to a little greater than 71% takes the sphericity tolerance (ST) to levels superior to our preceding designs.

Precisely because of the undulated form that the ecliptic band has, when we carry out the individualization operation (Step 2), the groups of panels located in the polar extremes (PE) ((PEN) for polar extreme North and (PES) for polar extreme South) join in such a way that we can predetermine the direction in which these will be stretched when the ball is hit. We can say that with the procedure of structural separation of the ecliptic band, we achieve a very particular "bipolar fit" over the totality of the spherical surface, that allows us to "muffle" (buffer effect) and redirect the stress that the ball supers with the blows.

The location of the undulations 8' 8" at the ecliptic, contributes with the establishment of a specialized mechanism for free kicks in regulation football that operates on the ball cover, from now on also called "swirl mechanism" (FIG. 7). The form of the ecliptic band locates three undulations 8' in the direction of one of the poles (PEN) and the other three undulations 8" in the direction of the contrary pole (PES), in such a way that when the ball is hit with a spinning effect around its polar axis (located between the exact center of PEN and the exact center of PES), the undulations 8', 8" have the possibility of aligning in the direction of the equatorial plane (perpendicular to the polar axis and cutting it in two equal lengths) and with this provoking a slight decrease in the length of the polar axis.

In FIG. 7, we can observe the arrows indicating the direction of the movement of ball cover material as well as the corresponding seams, when the pressure inside the ball rises. Note the rhombuses stretching in the direction of their smaller diagonal, this movement, pulls the (PE), (PEN) and (PES), in all directions, resulting in a flattening of the poles. Note the arrows along the ecliptic belt in the middle of the figure, tending to normalize it into a straight strip. This system of arrows show how the final result is that the undulations 8', 8" tend to flatten in the direction of the equatorial circumference (EC) when forces come out from the absolute center of the ball and towards the equatorial circumference (EC), highlighted with a dotted line in the center of the width of the ecliptic. The mechanical chart of arrows of FIG. 7, simulating the translation of seams and panel material, describes the results in the liberation of the energy of the blow with an effective stretching intent of the ecliptic band and the corresponding translation of the polar extremes (PE) in direction to the absolute center of the ball, as the only possible counterbalance. The forces of inertia caused by the spin, induced by the force of the sideways kick, contribute with the activation of this mechanism, in the same way the ocean mass of our planet accumulates around the equatorial zone.

The "swirl mechanism" for free kick and corner shots consists in creating, with the band separation procedures of Step 2 and the band adjustment procedures of Step 3, an intentional unbalance in the position of the panels, that permits a minimum swaying of the ecliptic band, but enough to modify the length of the equatorial circumference (EC) and the correlated change in the polar circumference (PC).

The existing unbalance between the two groups of panels in the polar extremes (PE) can be observed in FIG. 1 that shows a view that separates the three main groups of panels composing the ball cover. The imaginary arrows in FIG. 1, in the direction of the poles, serve as a guide to distinguish the direction in which the material that the ball is made up of tends to stretch and is also the direction of the arrows of FIG. 7, showing a plan view of the same arrangement. The direction of the arrows in both drawings (FIG. 1 and FIG. 7) would be the exact opposite for all the arrows, when the material and seams of the ball translates back from an aligned position of the ecliptic to the original undulated position, this swaying probably happening in a fraction of a second while the ball travels its 30 meter trajectory.

The deformation suffered by the ball cover after a hit to its structure, produces an increase in the internal pressure, which at the same time makes the ball recuperate its sphericity. With the "swirl mechanism" we make sure that the recuperation of the ball's sphericity takes place in a synchronized and balanced way, since all of the curves are connected (remember the above description of how all of the panels of the ecliptic can form one single panel, see FIG. 12D). The forces of inertia of the rotation produce the stretching of the ecliptic and as a compensatory effect a reduction in the polar diameter is produced, then, when the force of the revolutions decreases, the ball recuperates its sphericity in an orderly way, precisely because of the interweaved position that the undulations have, alternating its inclination towards one and the other pole.

According to the Physics World article (above described), a ball with a weight of 430 grams, that is hit in the precise place and accelerated to 112 Kph (70 mph) and at 9 revolutions per second, in a trajectory of 30 meters, during a flight of one second, can deviate to 4 meters from what would be its normal course in a straight line, which is enough to get any goalkeeper in difficulty. The same article states that when the amount of spin in the ball d the drag force that causes the curve also decreases. In that line we add that any effort in maintaining the spin of the ball during that single second of trajectory, is justifiable to increase the probability of causing the well appreciated "Magnus Effect" or "Comba Effect".

The "swirl mechanism" is particularly designed for the execution of free-kicks and allows the ball to manifest a movement of the undulations in the direction of the equator, when hit with the spin effect around its polar axis (sideways kick) and with enough force of inertia caused by the kick. When the material of the cover is mobilized in the direction of the equatorial zone, a polar axis squat is automatically produced, forming a stable oblate structure that allows the ball to conserve its rotational axis and with it allows for the conservation of the spin velocity for more time.

The more oblate a spinning object is, the easier it is for it to maintain its stability. The extreme of this affirmation, is found in the stability offered by the Frisbee. On the contrary, to try a free kick with "Comba Effect" using an american football instead of a regulation football, would seem impossible, since the longer polar axis with respect to the equatorial, makes it unstable as it moves spinning in a perpendicular direction to its turning axis and probably this instability would make it loose its turning axis immediately after the kick. The movement of an American football, a prolate spheroid, is more stable when it translates, with polar rotation and in the direction of its polar axis, such as when it is thrown in a "forward pass".

The design that describes the proposed method (i.e., FIG. 7), whose structure promotes the adoption of the oblate form in particular spinning circumstances, allows for the construction of special balls for the execution of direct free kick and corner shots in soccer, and for special balls to curve in general in any sport.

The bipolar characteristic of our proposals for a spherical cover, provides special characteristics not shared with other known designs. Balls that do not incorporate some type of mechanism in its structure, would have difficulty in obtaining a predictable and trustworthy performance. One example of an incorporated mechanism is presented in the international patent application for the "XYZ ball" (publication WO2005/079928) specially designed for an efficient velocity in recuperating its original spherical form, turning it into a ball that moves more rapidly from one place to the other.

Balls based in the structure of the icosadodecahedron, are efficient to distribute the sphericity, but they do not incorporate any mechanism in its structure. If the ball cover stretches, for these designs it is impossible to predict to what side the structure would move to sort the blow, which implies that a disorderly and random reaction of the structure will take place. Other designs, that do not even have divisions between the panels, like the ones utilizing thermal-bonding techniques to unify all panels into one large single panel, totally eliminate the possibility of establishing a mechanism that would permit some type of order in the recuperation of the sphericity.

Multipanel balls give the seams an important functionality, besides producing the union of the panels. The weaving of the seams produce a fold in the material toward the internal part of the spherical surface that provides rigidity to the union routes between the sides of the adjacent panels. This rigidity is the one that allows for the edges to function as a strut and at other moments the weaving material allows for the edges to act as a tension cable, thereby giving form to the spherical structure. The design of the panel arrangement draws an outline over the spherical structure that precisely forms the mechanism for the recuperation of the sphericity after a kick. Depending on the selected design, some outlines, like the 32-panel "bucky-ball", lack the functionality as a mechanism. Other outlines, like the ones we propose can be built following the three steps of our method, include an intentional counterbalance of the structure that activates a mechanical process in particular spinning circumstances.

The ample possibilities of structural readjustment that we describe in Step 1 and Step 2 of the method, allows for the experimentation with different types of panel arrangements; each one will outline a distinct mechanism. Our 30-panel example of FIGS. 4, 5, 7, 9B and 10C shows parallel seams that pass from one polar extreme to the other, going through the ecliptic band in a straight line, because of the ecliptic arrangement described in FIG. 12B. Conversely, in the ecliptic arrangement described, i.e., in FIG. 12C, the continuity of the seam is interrupted when arriving at the ecliptic band, this fact changes the particularities of the swirl mechanism, when comparing both models. For more details in regards to the differences between vertex-vertex and vertex-edge unions, we refer to the international patent application WO2005/079928 before mentioned.

Besides the seams arrangement utilized for constructing the ball, the flexibility of the material used on each panel, also contributes to the activation of our described blow absorption and sphericity redirection mechanism. The use of a more or less flexible material in select groups of panels would influence in the easiness or difficulty of the structural movement that will take place in the described mechanism. If the material used for the panels that make up the ecliptic band 1, is of greater or lesser flexibility than that of the rest of the panels making up the polar hemispheres 2 and 3, the swaying effect of the ecliptic band 1 will be different than when we use the same material for all the ball cover. A more rigid material would have the tendency to act as a lever in the auto-adjustment while a more flexible material will allow for a greater mobility in this area, promoting through these two forms the action of the structure's mechanism.

FIG. 10C illustrates the panel shapes and arrangement for a preferred embodiment of the ball or ball cover of the present invention presented in a planar arrangement prior to assembling into a spherical ball This arrangement is derived from the original 50 panel ball of the inventor's previous patent and FIG. 10A by reassignment of panel areas such that the squares 4, triangles 5 and trapeziums 6 previously making up the polar hemispheres are combined to form the panel configurations on either side of the ecliptic band 8 shown in FIG. 10C. This reassignment serves to reduce the number of panels involved, thereby facilitating assembly while at the same time defining the ecliptic 8 to permit the width reduction of Step 3 whereby the sphericity of the ball is improved. It is further pointed out that the panel shapes and arrangement of FIG. 10C provide for optimum direction of forces about and through the panels as discussed in connection with FIG. 7.

For the specific case of the described 30-panel ball (FIG. 7), as an example, we can think of utilizing a flexible material for the three rhombuses located on each polar sector. This would directly influence the oblate transformation, since the conformation of the rhombus acts as a regulator of the heights of the curves of the ecliptic. Note that in FIG. 7, all the panels in the upper part of the central 6-panel ecliptic band, compose the polar extreme North (PEN) and the panels in the lower part compose the polar extreme South (PES). Also note that 3 of the panels from each (PE) are separated from the arrangement for symmetry reasons, but the correct positioning for the arrangement is described in FIG. 10 C.

We have proven that when turning the position of the rhombus 90 degrees, in our described 30-panel, with its ecliptic band die reduced to 76% of the original width, and using material of equal flexibility for all panels, we produce a clear effect that shortens the polar axis of the modified cover. The measurements carried out determined that the polar circumference went from PE≈67.5 cm. to PE=68 cm. and the equatorial circumference went from EC≈67 cm. to EC=69 cm., characteristic measurement of an oblate spheroid. One solution to this deformation consists in changing the width of the band from 76% to a width closer to the original 100%. Note that this procedure involves additional steps, because in Step 3 we already modified the band width to 76%, but since in Step 4 we rotated the rhombuses, a step 5 is needed to make further band width readjustments (it is important to clarify that the described step 4 and 5, are named because of the numerical order in which they were taken, but these additional steps are only Step 1 and Step 3 repetitions, respectively). Nonetheless, what we intend with this example, is to demonstrate how small changes in the conformation of the rhombus produce a large squatting effect in the poles.

The reduction of the polar axis is produced because the superior part of the curves of the ecliptic, the ones that are closer to the absolute center of the polar extremes (PE), have more liberty to move material towards the equator of the ball, which causes a stretching of the equatorial circumference and shortens the polar axis. That is why, the use of diverse types of flexibility, for select groups of panels, can facilitate the adoption of an oblate conformation when the forces of inertia of the spin around the polar axis, provoke the stretching of the equatorial zone, that activates the specialized mechanism for free kicks provided by the undulations of the independent ecliptic band.

Our method, provides an ample possibility of experimentation with diverse models for the measurements of the rhombuses and the distance (c), for the distribution of seams and the determination of the width of the ecliptic band. The proposed method allows for the study of the effects of the ecliptic band adjustments that compensate the tension forces existing all over the spherical surface, it allows for the establishment of techniques to improve the sphericity of a group of panels, finally facilitating the comprehension of the mechanics that operate in the circumference formation.

In this sense it is interesting to study the mechanical characteristics of the model of measurement "(c)=sqrt(3)×((d)−(a)", when "(d)=⅛(C)", of the mentioned patent, which used 18 squares (instead of the 12 Z-rhombuses and 6 X-squares). This model produces a sphericity of "(C1)−(C2)=4((a)−(b))". Since the measurement (C1) is greater than (C2), once separated and adjusted the selected ecliptic band, it would seem interesting to extend the diagonal (d) (the one that joins the X-squares) to all of the 6 squares located in the polar extremes, with its corresponding decrease in the diagonal (d2) (the one that joins the Y-triangles), with the intention of reverting the effect (C1)>(C2) and also promoting the changes in the diameters of the Y-axis, with respect to the diameters of the X-axis.

Even though the ultimate intention of the method is to supply a ball with a sphericity tolerance (ST) close to 0%, it is interesting to think of the use of balls with a slight inclination towards the prolate and oblate conformation, i.e. 1.5% or 3.5% (ST). With the help of the method-we can fabricate intentionally an oblate spheroid, but complying or getting close to the (ST) sphericity specification that FIFA demands. We can experiment with prolate spheroids, to study the performance in the direct kicks without the effect of the sideways kick, when its polar axis points in the direction of the movement. Finally, the method also allows for the production of spheroids with specific bulges in determined sectors, in order to carry out scientific studies on their flight mechanisms.

An additional advantage of the proposal for a ball cover in the present invention, is constituted by the fact that our balls include an original ornament in their structures which avoids the need to include patterns to make it more striking. Since the ecliptic strip is structurally separated from the rest of the spherical surface, it is easy to highlight its undulations with the use of materials of different colors, which avoids the cost of the process of including patterns and at the same time would differentiate it from other balls that do not produce undulated designs in the seams outline. The undulating band that characterizes our design can be highlighted by utilizing diverse panel colors. It is interesting to note how we can represent the majority of the colors in the flags of the world and the different soccer clubs in a new undulated way.

However, the functionality of the colors to highlight the ecliptic does not constitute a simple use as an ornament, the principal objective of coloring is to distinguish the orientation of the rotation axis. When using a different color for each one of the three groups of panels that make up the spherical cover (FIG. 1), it makes it easier to place the ball in the position preferred by the player before the free kick and after the kick it permits for an immediate feedback of the spin effect achieved.

By choosing a light color for the group of panels in one polar extreme, a dark color for the group of panels of the contrary polar examine and a neutral color, preferably white, for the group of panels that make up the ecliptic band it is possible to easily distinguish the direction in which the ball is turning. For example, if the ball is kicked when the dark color is positioned on the ground and once in the air we note the dark color on top it is possible to obtain data on the trajectory that would not be known if both polar ends are of similar color. Furthermore, the white color of the ecliptic band allows us to estimate the spin velocity since the undulations can be easily distinguished in contrast with the other two colors.

The use of color gives the player immediate information on his actions and furthermore allows the spectator to appreciate the type of effect achieved, which increases the experiences of the show.

Furthermore, the easy distinction of the ball's movements, give the trainers and team partners the possibility to share the experience of the curving technique. Furthermore, with slow motion films it will be able to appreciate even better the techniques used.

In a sport that becomes more and more technical, as soccer, we require a new generation of smart balls.

With our proposal for a ball cover we look to incorporate technology into the free kicks and the soccer kicks, with the intention of giving more dynamism to the sport and especially more goals.

Finally we will talk about the possibility of making changes in the form of the curves of the spherical structure. The undulations of the ecliptic are formed by straight line routes, coinciding with two of the sides of the rhombus and two of the sides of the trapezium. To soften the transition of the curve when it changes its angle between one and the other route, it is possible to bring material from the polar panels or even give away material of the ecliptic belt. We could also think of the possibility of simply softening the vertices of said curves without considering the movement of material, as long as we consider the effect that this can cause in the sphericity, in order to later be able to correct he defects in accordance with the possibilities that the method allows. Since the width of the rhombus is different than the measure (b), we can look for a design of the band that will alternate between wider and thinner or even we can think in making the width of the band uniform. A simple way of modifying the curves is the one that can be observed in FIG. 13, where only material from the panel next to the trapezium on base (a) and short side (c) is manipulated. The way in which we soften the curves that define the undulations will influence, of course, the sphericity results obtained, and we would have to make the needed adjustments.

While this invention has been presented particularly with respect to an improvement in the sphericity and roundness of multi-panel soccer balls as well as for the soccer ball covers, it is understood that this invention is not limited to the options here presented but it can be adapted to the formation of other articles and products of a hollow spherical form.

What is claimed is:

1. A ball having improved sphericity evidenced by a circumference with a selected measurement (C), comprising:
   a plurality of interconnected panels comprising first and second groups of panels which combine to form a sphere,
   said first group of panels defining at least two different surface areas of said ball corresponding to polar hemispheres of said sphere;
   said second group of panels defining an area of said surface in the form of a circumferential band having a width, and said area having generally parallel sides along its length with at least three undulations and disposed in the equatorial zone of said surface of the said ball, creating a separation between and joining said polar hemispheres defined by said first group of panels;
   whereby the width of said band is modified to improve the sphericity of the ball and obtain a ball of a selected circumference with measurement (C).

2. The ball of claim 1, wherein the selected measurement (C) represents a modification of the width of the band and comprises a reduction of from 10% to 50% and wherein said reduction is determined by the moment at which a prolate spheroid becomes a sphere of a circumference (C) before becoming an oblate spheroid.

3. The ball of claim 2, wherein said second group of panels is made up of six rhombus and six trapezium and each of said areas of said first group of panels is made up of four equilateral triangles, six rhombus and nine trapezium.

4. The ball of claim 3, wherein at least one of said panels in the form of a rhombus is a square.

5. The ball of claim 3, wherein at least one panel of said groups of panels is of elastic material.

6. The ball of claim 3, wherein at least one panel of said groups of panels has a greater rigidity than the rest of the panels.

7. The ball of claim 3, wherein the measure of the reduction in the width of the band is determined by a larger number than the difference between the polar circumference and the equatorial circumference, divided by two.

8. The ball of claim 7 wherein the width of the band following reduction is equal to 71% of the original width and to 21% of the diameter of said ball.

9. In an inflatable ball for ball games comprising a circumference with a selected measurement (C), a surface comprising a plurality of interconnected basic shapes comprising eighteen squares, twenty four trapezoids and eight equilateral triangles, said squares having four sides of substantially equal length (a) and two corresponding diagonals of length (d), said triangles having three sides of substantially equal length (c) and a central point (Y) and said trapezoids having four sides composed of two legs of said length (a), one base of said length (a) and a smaller side of said length (c), each of said trapezoids being enclosed by three of said squares and one of said triangles wherein said sides (c) of said trapezoids are connected to said sides (c) of said equilateral triangles and said sides (a) of said trapezoids are connected to said sides (a) of said squares, and wherein said interconnected basic shapes are grouped into three groups of sections, two groups of sections comprising nine trapezoids, six squares and four equilateral triangles forming a polar hemisphere with a central point (Y) with one of said four triangles located exactly in the polar extreme, and a third group of sections comprising six trapezoids and six squares forming an undulated equatorial band, having generally parallel sides along its length said ball comprising two of said polar hemispheres joined along adjacent sides to adjacent sides of the equatorial band, wherein the improvement comprises: decreasing the width of the equatorial band by between 20% and 40%, creating a reduction in the measurement of the polar axis with respect to the measurement of the equatorial axis, forming said equatorial band from an appropriate material, whereby a ball with a selected measurement of circumference (C), improved sphericity and improved characteristics is obtained.

10. The ball of claim 9, wherein said decrease in the width of the band is of 29%.

11. The ball of claim 9, wherein said appropriate material of the equatorial band has an elasticity greater than said two polar hemispheres of said ball.

12. The ball of claim 9, wherein said appropriate material of the equatorial band has a hardness greater than said polar hemispheres of said ball.

13. The ball of claim 9, wherein said appropriate material of the equatorial band has a hardness similar to said polar hemispheres of said ball.

14. The ball of claim 9, wherein the degree of decrease of said width of the equatorial band is determined by a comparison between the length of the polar axis, and the length of the equatorial axis and is calculated approximately as one half the difference between the polar axis and the equatorial axis, said calculation being repeated several times until making the polar axis and equatorial axis equal.

15. The ball of claim 9, wherein the degree of decrease of the width of the equatorial band to be applied is determined based on the difference between the actual measurement of the polar axis and actual measurements of the equatorial axis before applying the reduction, determining the degree of decrease necessary to achieve equality between both axes.

* * * * *